United States Patent [19]
Jeger

[11] Patent Number: 6,105,873
[45] Date of Patent: Aug. 22, 2000

[54] CHIP CARD AND PROGRAM FOR CHIP CARDS

[75] Inventor: Peter Jeger, deceased, late of Motier, Switzerland, by Brigitte Jeger-Kühne, legal representative

[73] Assignee: Swisscom AG, Bern, Switzerland

[21] Appl. No.: 08/982,476

[22] Filed: Dec. 2, 1997

[30] Foreign Application Priority Data

Dec. 12, 1996 [EP] European Pat. Off. ............. 96810838

[51] Int. Cl.⁷ .................................................. G06K 19/00
[52] U.S. Cl. .......................................... 235/487; 235/492
[58] Field of Search .................................... 235/487, 492, 235/488, 493; 361/737, 397, 394

[56] References Cited

U.S. PATENT DOCUMENTS

| | | | |
|---|---|---|---|
| 3,699,311 | 10/1972 | Dunbar | 235/487 |
| 3,702,464 | 11/1972 | Castrucci | 235/487 |
| 4,511,796 | 4/1985 | Aigo | 235/492 |
| 4,552,383 | 11/1985 | Hope et al. | 235/488 |
| 4,674,175 | 6/1987 | Stampfli | 29/288 |
| 4,822,988 | 4/1989 | Gloton | 235/492 |
| 4,825,283 | 4/1989 | Shino | 235/492 |
| 4,835,846 | 6/1989 | Juan et al. | 235/492 |
| 5,049,728 | 9/1991 | Rovin | 235/492 |

FOREIGN PATENT DOCUMENTS 0 172 108  2/1986  European Pat. Off. .

*Primary Examiner*—Michael G Lee
*Assistant Examiner*—Daniel St. Cyr
*Attorney, Agent, or Firm*—Pillsbury Madison & Sutro LLP

[57] ABSTRACT

A chip card comprises a microprocessor able to execute a program recorded in memory and one or more removable portions, which may be, for example, pre-cut portions. The execution of the program can be modified by tearing off or cutting one or more of these portions. The program may include an instruction to test a register whose contents depend on the presence of one of the removable portions. Many applications, such as an electronic visiting card, are possible with the disclosed chip card.

12 Claims, 3 Drawing Sheets

CHIP CARD AND PROGRAM FOR CHIP CARDS

BACKGROUND OF THE INVENTION

This invention relates to the field of chip cards.

A by chip card in the following specification and in the claims refers to a card integrating at least one electronic circuit, for example a microprocessor and/or memory elements, and interface means allowing the card to communicate with a chip card read and/or write device. The interface means can comprise, for example, a zone of electrical contacts on one of the faces of the chip card or a coil allowing a contact-free reading or change of the contents of the card. The majority of current chip cards have standardized dimensions of 53.98×85.60×0.76 mm. The chip cards are generally manufactured by lamination of a plurality of synthetic layers, the electronic circuit being accommodated in or on one of the internal laminated layers. A microprocessor is any sequential device able to execute a program or a microprogram recorded in a memory internal or external to the microprocessor. A by memory element is any type of read-write memory or read-only memory. A by program is any series of instructions intended to be executed sequentially by a microprocessor or a sequential device. The by the execution of a program refers to the sequence of instructions and the values taken by the variables during a particular running of the program.

Chip cards have an area of application which is becoming broader and broader. Examples include personal identification such as, for example, access cards for reserved or restricted areas, banking cards, payment cards, storage of confidential data, use of automated machines in particular telephone booths, mobile telephones (SIM cards—Subscriber Identification Module—in GSM technology), multiple or seasonal tickets, pay television, etc.

Conventional chip cards require a read-write device adapted to read or modify their contents. Such a device is relatively costly and cumbersome and thus cannot be used everywhere, which limits the possible chip card applications.

SUMMARY OF THE INVENTION

One object of this invention is to propose an improved chip card.

According to the invention this object is attained by a chip card comprising a microprocessor able to execute a program recorded in a memory, wherein the execution of said program can be modified by removing one or more chip card portions provided for that purpose.

In a variant, this object is achieved through a chip card comprising at least one electronic memory element and interface means allowing the card to communicate with an external device, wherein access to certain portions of said memory element can be blocked or released by removing one or more chip card portions provided for that purpose.

This object is also attained with a program intended to be executed by a microprocessor accommodated in a chip card wherein said program includes at least one step whose execution depends on the presence or absence of one or more chip card portions designed to be able to be removed.

The invention also concerns programs intended for chip cards according to the invention and chip card read-write devices specially adapted for communicating with chip cards according to the invention.

BRIEF DESCRIPTION OF THE DRAWINGS

The invention will be better understood with the aid of the following description, given by way of example, and illustrated with these figures.

The figures are diagrams. Therefore, in general, it is not possible to deduce dimensions from them.

DETAILED DESCRIPTION OF THE EMBODIMENTS

Figure 1:
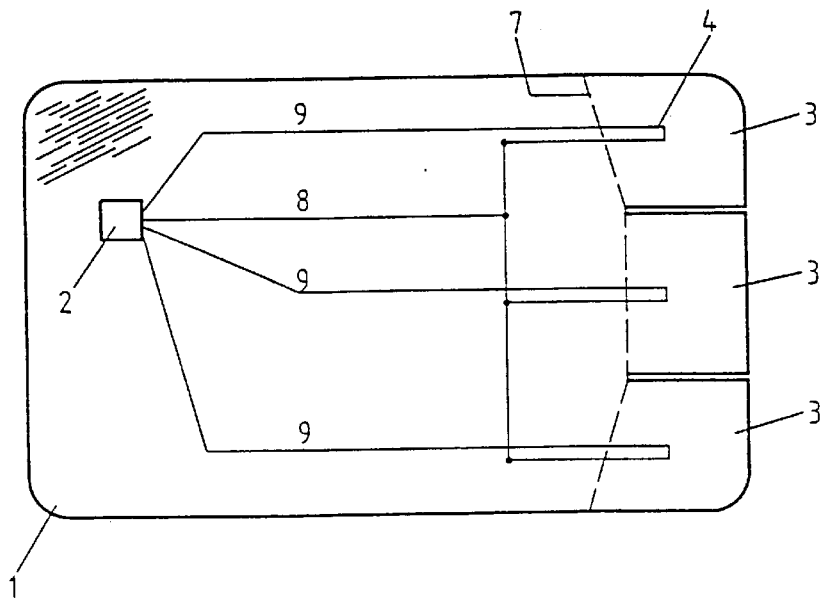
FIG. 1, a first variant of the chip card according to the invention comprising three removable portions with one resistive element in each removable portion.

FIG. 1 illustrates diagrammatically a first variant of the chip card according to the invention. The card includes a microprocessor 2 able to execute a program recorded, for example, in a read-only memory integrated in the microprocessor. The microprocessor is preferably mounted on a very thin printed circuit board disposed between two synthetic layers. The microprocessor 2 can also be embedded in a layer of bonding material or resin between two outer layers of the card. The chip card preferably has interface means (not shown) allowing the microprocessor to communicate with a device outside the card. The interface means can be made up, for example, of a zone of metallized contacts flush with an outer face of the card. The interface means, however, can also be made up of a coil in the card able to communicate with another coil in an external read-write device. Other electronic components can be accommodated in the card if needed, for example, further microprocessors, memory elements, discrete electronic components, a battery, etc. Moreover, the card 1 can incorporate additional security elements in a well known way, for example a hologram, a photo or fingerprints.

The chip card 1 has in this example three removable portions 3 designed to be able to be torn off or lifted off. In this exemplary embodiment the removable portions 3 are separated from the rest of the card by a precut line 7, enabling the user to easily pull off each of the portions 3 independently. Other means can be provided to permit the lifting off of any one of the portions 3. For example, the card can simply be given a printing on one of its faces along the line 7 suggesting that the card be cut at that place. In a variant, one of the layers of lamination making up the card is made thin along the line 7 in such a way that the card breaks at that spot when the removable portions 3 are bent. In another variant, a thread can be integrated in the structure of the card along the line 7. By pulling it, the corresponding removable part 3 can be torn off. Other means of removing by cutting, tearing off, indentation, punching, etc. can easily be conceived by one skilled in the art.

The chip card 1 integrates an electric circuit formed by a plurality of branches connecting the microprocessor to each of the removable portions 3. The different possible configurations of the circuit will be discussed further on. The branches of the circuit can be made up of electrical wires, for example, embedded in the structure of the card, or by paths of a printed circuit making up one of the layers of the card, for example. At least one branch of the circuit passes through each removable portion 3. This branch is cut when the removable portion is removed.

In FIG. 1, the branches 4 passing through each removable portion 3 are made up solely by an electric wire. By pulling off or cutting one of the portions 3, the corresponding branch 4 is cut, whose resistance passes from that of a short circuit (some ohms) to that of an open circuit. This change of resistance is detected by the microprocessor 2. The program executed by the microprocessor 2 includes at least one instruction in which the result depends on this resistance. The execution program will thus differ depending upon the presence or absence of each removable portion 3. We shall see further on an example of applications for chip cards where this feature is of advantage.

Figure 2:
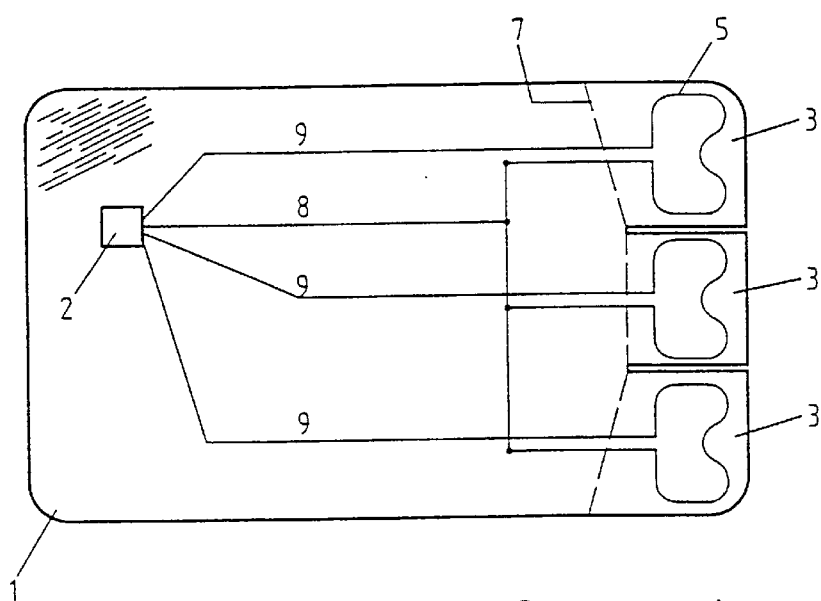
FIG. 2, a second variant of the chip card according to the invention comprising three removable portions with one inductive element in each removable portion.
Figure 3:
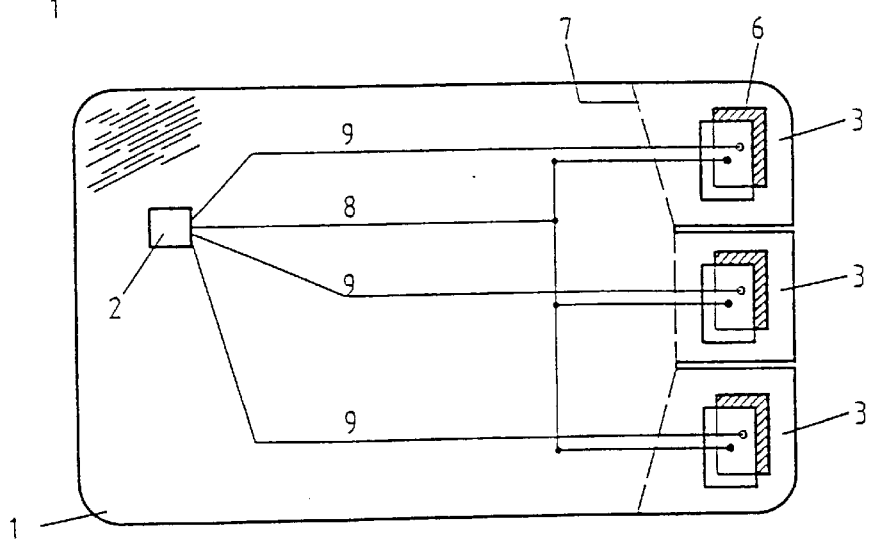
FIG. 3, a third variant of the chip card according to the invention comprising three removable portions with one capacitive element in each removable portion.

With the configuration of the circuit adopted in FIGS. 1 to 3, the presence or absence of each removable portion can easily be detected by the microprocessor by writing a signal on the transmission line 8, for example a signal at +5V, and by reading the value of the signal received in return on each read line 9 corresponding to each removable portion.

FIG. 2 illustrates a variant of the invention in which the branches passing through each removable portion integrate an inductive element 5. The inductive element can be made up of a discrete coil element soldered to wires 8, 9, or the wires can be constituted by paths of the printed circuit, or more simply by a spiral arrangement of the conducting paths of the printed circuit. The tearing off of one of the removable portions 3 causes an abrupt change in the inductance of the corresponding inductive element, a change which can be easily detected by the microprocessor 2.

FIG. 3 illustrates a variant of the invention in which the branches passing through each removable portion integrate a capacitive element 6. The capacitive element 6 is preferably made up of two capacitor plates accommodated in distinct layers of the arrangement of laminated layers making up the card 1. The lifting off of one of the removable portions 3 causes a significant change in the associated capacitance, a change which can easily be detected by the microprocessor 2, for example by sending an alternating signal on the transmission line 8 and by analyzing the signal received on each read line 9.

The variant of FIG. 1 is simple and economical to realize. On the other hand, it does not offer optimal security since it would not take much trouble for a forger or counterfeiter to cause a short circuit between the wire 8 and one of the wires 9 of a torn-off portion 3. For example, a short circuit between the wires 8 and 9 could be simulated by metallizing along the cutting line 7 of a torn-off removable portion. This variant therefore applies only to applications where the security requirement is not very crucial. In this regard, the costlier variants of FIGS. 2 and 3 are much more secure since they can only be forged or counterfeited by soldering an inductive element, or respectively a capacitive element, between the cut wires of the torn-off portion.

Figure 4:
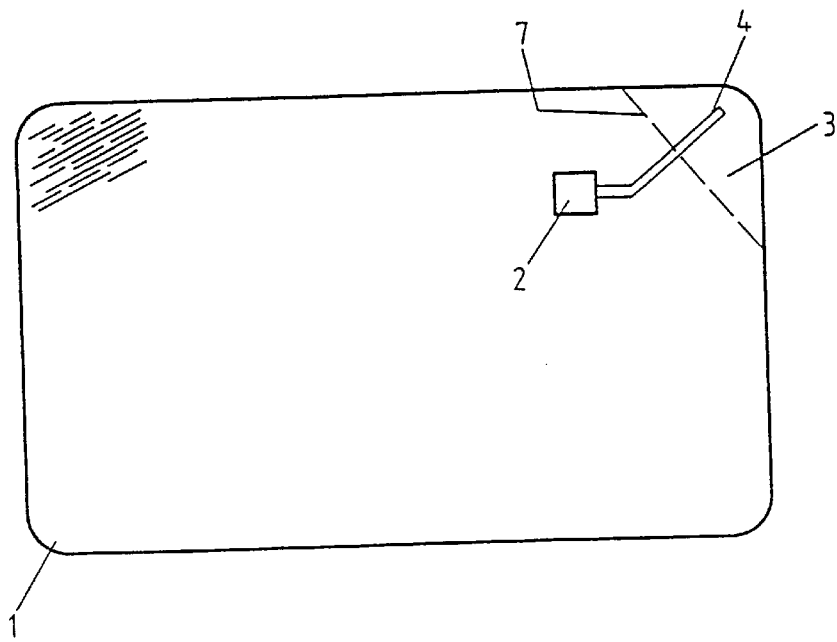
FIG. 4, a fourth variant of the chip card according to the invention comprising a single removable portion.

The invention is obviously not limited to the particular case of three removable portions as illustrated in FIGS. 1 to 3. There can be any number of removable portions, depending upon the application, and the number is only limited by the difficulty possibly entailed in tearing off portions which are too small. At the same time the arrangement of removable portions on one side of the card is given only as an especially practical example. FIG. 4 illustrates another variant in which only one corner 3 of the card 1 can be torn off. The microprocessor 2 is preferably placed close to this corner. Several pre-cut corners can also be provided of course.

The dimensions of the intact chip card are preferably those of the standardized ISO format indicated above, and less than this standard when one or more removable portions 3 have been precut. In a variant, the dimensions of the complete card are greater than the ISO format, and equal to this format when all the removable portions 3 have been torn off.

The removable portions 3 can likewise be provided toward the middle of the card instead of on one of its edges. In this case, they will be removed, for example, by pressing down or punching out these portions provided for this purpose with a finger or with an adapted instrument. Understood here by provided for this purpose is, for example, a precut portion, a portion made of a less resistant material, or simply a zone specially marked for this purpose on one of the outer faces of the chip card 1.

Figure 5:
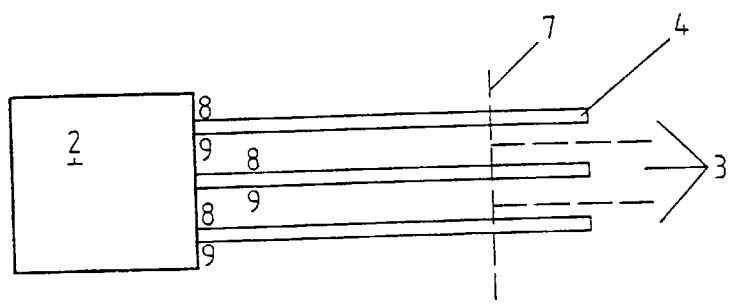
FIG. 5, illustrating a second possibility of connecting electrically the removable portions of the chip card to the microprocessor.

FIG. 5 illustrates diagrammatically another possible configuration of the circuit between the microprocessor 2 and the removable portions 3. In this variant, each portion 3 is connected to the microprocessor by an independent loop, i.e. the microprocessor has a separate output 8 and input 9 for each removable portion. Compared to the preceding variant, this configuration requires more outputs on the microprocessor 2.

Figure 6:
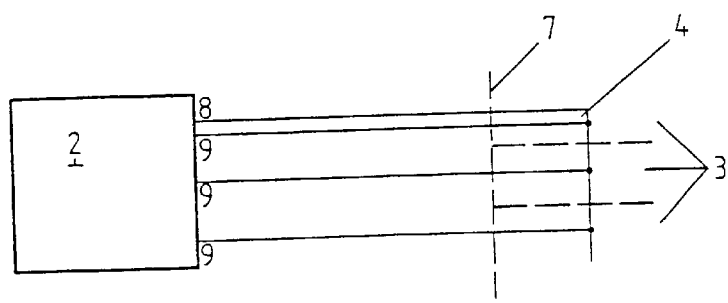
FIG. 6, illustrating a third possibility of connecting electrically the removable portions of the chip card to the microprocessor.

FIG. 6 illustrates diagrammatically a third possible configuration of the circuit between the microprocessor 2 and the removable portions 3. In this variant, the removable portions 3 are traversed in series by the writing line 8. This solution requires the same number of lines as the variants illustrated in FIGS. 1 to 3. However, it is not possible to distinguish all the torn-off configurations from one another. For example, the microprocessor cannot determine whether all the portions 3 have been torn off or only the removable portion at the top in this figure. This solution is suitable, for example, for chip card applications where the removable portions 3 must be torn off in a predefined order.

Figure 7:
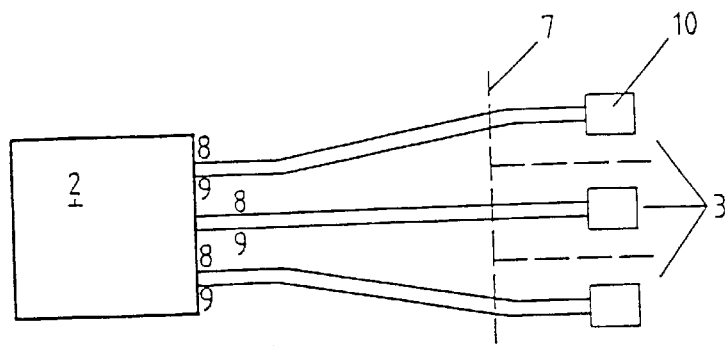
FIG. 7, illustrating a variant of the chip card in which each removable portion of the card includes an electronic memory element.

FIG. 7 illustrates another variant of the invention in which each removable portion 3 integrates an active element, in this example a memory element 10. The memory element 10 can be made up of a read-write memory or preferably a read only memory, storing at least one bit or many more. Depending upon the type of memory 10, a number of lines greater than two will probably be necessary between the microprocessor 2 and the removable portions 3. This variant offers optimal security, since the information recorded in the memory elements 10 is made physically inaccessible when the corresponding removable portions 3 are torn off.

One skilled in the art will understand that the invention is not limited to the described examples of removable zones containing a resistor, an inductive element, a capacitive element or a memory element, but that any combination of one or more passive or active elements in each removable zone can be used. Moreover, different removable zones on the same card could possibly include passive or active elements of different types or different values. In this case, other possible configurations of the circuit between the microprocessor and the removable portions can be easily conceived. For example, if each removable zone contains a resistor of different value, it is possible to connect them all in parallel with a resistance-measuring means integrated in the microprocessor.

Figure 8:
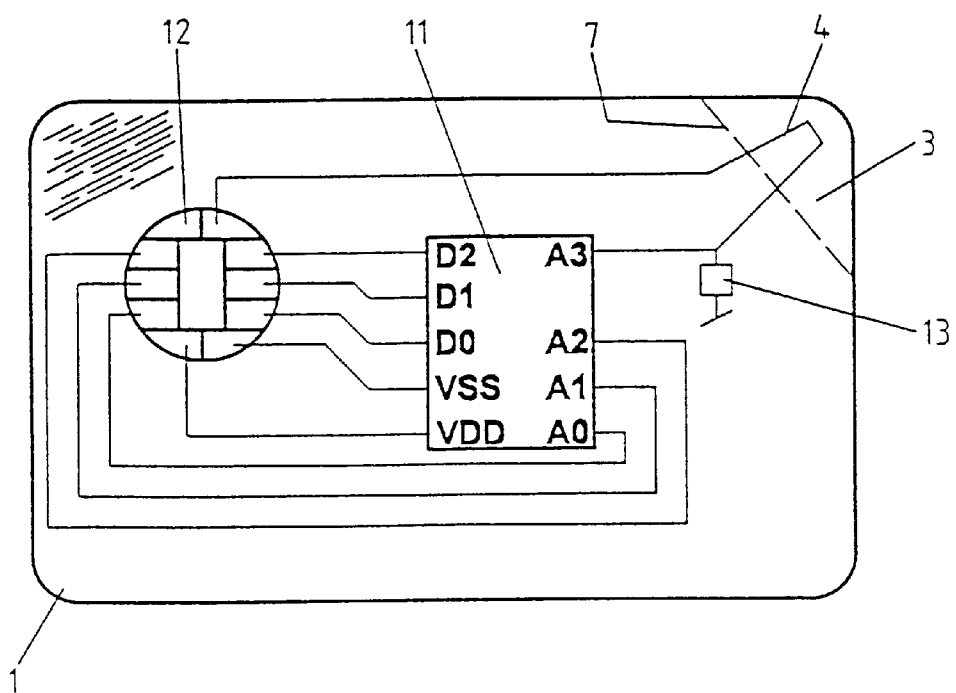
FIG. 8, illustrating a variant of the chip card having a memory element, but no microprocessor.

FIG. 8 illustrates a variant of the invention applied to cards without microprocessors, in particular cards just having one or more memory elements 11 intended to be read by an external device. The memory 11 communicates with the exterior of the card 1 through an interface represented symbolically here in the form of a zone of electrical contacts 12. In practice, the memory 11 will preferably be situated directly under the contact zone 12. Access to certain portions of the memory depends on the presence or absence of removable portions 3. The memory 11 comprises in this example 4 address lines numbered A0 to A3 and three data lines D0 to D2, as well as two feed lines Vss and Vdd. The memory could also comprise other lines, particularly read/write lines, depending upon the type of memory (examples: EPROM or EEPROM).

All the inputs-outputs of the memory 11 are directly connected to different portions of the contact zone 12, thus allowing an external device to read the memory or to modify it directly. Only the high-order line of address A3 passes through the removable portion 3 between the microprocessor and the contact zone. A pull-down resistor 13 is connected between input A3 of the memory and the ground. By tearing off the removable portion 3, the input A3 is forced to remain at zero: access to the upper half of the memory is thus blocked.

This variant can of course be applied without any difficulty to cards having a plurality of removable portions allowing each portion to block access to a specific portion of the memory. If address lines other than the high-order line pass through the removable portions 3, it is possible to block access to memory portions of varying size. By adapting the circuit very slightly, it is also possible to produce cards in which certain portions of the memory are only accessible when certain card portions have been previously torn off.

We shall now discuss briefly a certain number of applications for the different variants of the chip card according to the invention, in particular the variants discussed above. These applications are given only by way of example, in a non-limiting way, it being understood that other applications can also be conceived.

The applications of the invention can be divided into three groups. In the first group of applications, the removal of removable portions 3 enable blocking of a service or a function of the card which is accessible only when the card is intact. In contrast, in a second group of applications, the removal of removable portions 3 permits access to a service or function of the card blocked when the card is intact. Finally, in a third group of applications, the removal of removable portions 3 causes a change of any kind in the execution of the program executed by the microprocessor of the card or in the read-write system of the card.

An example of the first series of applications relates, for example, to electronic visiting cards or business cards. The conventional visiting cards or business cards have the drawback of being expensive to print because they are made in small series. Each change of the personal particulars means printing a new series of cards. Moreover, the volume of information that can be placed on an ordinary visiting card or business card is limited by the surface of the card. In addition, it is not possible to adapt the range of data on the card to the person to whom the card is given. Finally, the person receiving the card often wishes to introduce the data given on the card into a data base or an electronic agenda, which takes quite a lot of time. To overcome some of these drawbacks, it has been proposed, for example in the British patent document GB 2270875, to equip the visiting card or business card with an electronic memory in which certain data are stored which can then be released by a suitable device. It is not possible, however, to store confidential information in the electronic memory of the card because it is impossible to prevent someone receiving the card from reading such data.

A first proposed application of the card thus concerns an electronic visiting card or business card allowing selection of the range of information given to the person receiving the card. In this example, the visiting card or business card contains several types of information:

1) The data usually included on a conventional visiting card or business card: surname, first name, address, company, position, telephone, fax, e-mail, etc. This data always remains accessible.
2) Other non-confidential information, such as products of the company, addresses and names of people to contact. Depending upon the capacity of the memory, graphics or images could also be stored. This information likewise remains always accessible.
3) Sensitive or confidential information about the owner, such as medical history, allergies, persons to call in case of emergency, etc. This information is not given to just anybody, but only to one's doctor, for example. Access to this data can be blocked by detaching a card portion 3 provided for this purpose.
4) Other confidential information which is not to be given to anyone outside the company circle, or information to be given only to trusted suppliers or clients. This information can likewise be rendered inaccessible by tearing off another removable portion 3 of the card.

Another application relates to access cards for restricted or reserved areas, for example in factories or in ski regions. Conventional chip cards are already known with programmable keys. In the prior art, a special read-write device is used to program the card and to define the zones or doors to which access is given by the card. These devices are costly and difficult to program. A second application therefore relates to access cards for restricted or reserved areas, for example a factory or a ski area, in which the access to certain zones can be circumscribed by tearing off a portion of the card, thus without any apparatus and without any programming. An advantage is that it is easy to verify visually and without the use of any apparatus to which zone the card gives access. Such a card can be used to advantage in a mixed environment having at the same time zones closed by gates which are opened by introducing a chip card in a card reader and other zones monitored by personnel checking the access cards visually.

A similar application relates to chip cards used for pay television. Pay television stations are already known which can be viewed only by users equipped with a decoder. To use the decoder, it is necessary to introduce a chip card which gives the right to a certain number of hours of viewing, for example. A chip card having removable portions according to the invention can be used to limit access to the offered programs. In this case the chip card has one or more removable portions corresponding to one or more types of programs. The decoder is programmed to decode a certain type of program only if a card bearing the corresponding portion is inserted in the card reader of the decoder. It is thus very easy for parents to block access for their children to certain types of programs.

Another similar application relates to electronic cash or e-cash. Electronic cash cards are sold in a kiosk: the value of the card can be changed by the seller by tearing off removable portions of the card. It is therefore unnecessary for the seller to have in stock a selection of electronic change cards of different values.

Another application relates to SIM (Subscriber Identification Module) cards used in particular in GSM standard mobile telephones. These cards contain a series of data concerning the user, and can be programmed to give the owner access to supplementary telephone services. The user who lends someone his telephone may wish to limit access to certain services: by tearing off certain removable portions of a chip card according to the invention, it is possible to block access to certain services or to certain telephone numbers.

As indicated, the second group of applications concerns cards in which the removal of a removable portion frees access to a service or a function of the card which had been inaccessible when the card was intact. This series concerns above all applications in which it is important to be able to verify visually how the card has been used and how many times. It concerns above all multiple tickets for a series of services. For example, a card for the subway or underground train is programmed to open a gate only if the user has pulled off each time a supplementary, removable portion 3 of his card. The user can thus easily verify how may rides remain on his multiple ticket.

When the card contains confidential data, for example personal data or a secret password, the purchaser wishes to ensure that the card has not been read by an intermediate party between the producer of the card and himself. Likewise, for cards intended to be used in automated machines or giving the right to services paid for through purchase of the card, the purchaser wishes to ensure that the card he has bought has not been used by an intermediate person. According to the invention, it is easy to provide the card with a removable counterpart so that the card is usable only when the counterpart has been removed. In this way it is easy for the user to check whether his card is untouched or whether it has already been used.

A typical application of this type concerns credit cards containing personal and/or confidential data which are only readable if at least one removable portion 3 has been torn off beforehand.

The electronic cash (e-cash) cards can also take advantage of this second group of applications. In this case, the e-cash card is loaded with a predetermined amount which can only be released, all at once or in several smaller amounts, by tearing off one or more removable zones. In this way, the purchaser can be certain that the purchased card still contains the whole amount which was loaded on it. The removable zone 3 in this case plays the role of a seal making it possible to verify visually that the card has not been used. Several removable zones 3 can be provided on the card, the tearing off of each zone releasing a sub-total of the total amount loaded on the card. However, for this application the card preferably contains a single removable zone 3 enabling the total amount loaded on the card to be released.

The third group of applications is more general, and in fact also includes applications of the first and second groups. It concerns applications based on a program containing at least one instruction the result of which depends on the presence or absence of a removable portion 3. The removal of a removable portion of the card causes the modification of a register of n bits (n≧1) in the microprocessor 2. The microprocessor includes at least one instruction to test or to read this register so that the removal of a portion 3 causes a change in the execution of the program executed by the microprocessor. The modifiable register can also be used as a variable in any logical or arithmetical operation executed by the microprocessor and leads in this way to a modification in the execution of the program, the same sequence of instructions being executed in this case regardless of the value of the modified register, but with another set of variables.

If the card contains a microprocessor 2, the tearing off of a removable portion 3 causes a modification of the program executed by the microprocessor 2. If the card does not contain a microprocessor, the removal of a removable portion 3 can be detected by an external read-write device containing a microprocessor executing a program including at least one step of reading data on the chip card.

What is claimed is:

1. A chip card, said chip card comprising:
   at least one irrevocably removable chip card portion; and
   a microprocessor for executing a program recorded in a memory, wherein execution of said program is modified when said at least one chip card portion is irrevocably removed from said chip card.

2. The chip card of claim 1, wherein said microprocessor forms part of an electric circuit having a plurality of branches, wherein at least one branch passes through each said chip card portions, wherein removal of each card portions causes a break of the associated circuit branch, said microprocessor being connected to said circuit to detect said break.

3. The chip card of claim 2, wherein said branches passing through said chip card portions include at least one resistive element.

4. The chip card of claim 2, wherein said branches passing through said chip card portions include at least one inductive element.

5. The chip card of claim 2, wherein said branches passing through said chip card portions include at least one capacitive element.

6. The chip card according to claim 5, wherein each said capacitive element has two capacitor electrodes accommodated in two different layers of said laminated chip card.

7. The chip card of claim 2, wherein said branches passing through said card portions include at least one memory element.

8. The chip card of claim 1, said chip card further comprising:
   at least one register whose content depends on a presence or absence of said one chip card portion; and
   a recorded program in said memory includes at least one instruction to test or to read said register.

9. A chip card, said chip card comprising:
   at least one irrevocably removable chip card portion; and
   at least one electronic memory element and an interface allowing said chip card to communicate with an external device, wherein access to certain portions of said memory element is blocked or released by removing said at least one chip card portion.

10. A program intended to be executed by a microprocessor accommodated in a chip card wherein said program includes at least one step whose execution depends on a presence or absence of said at least one irrevocably removable chip card portion on said chip card.

11. The program of claim 10, said program further comprising:
    an instruction to read a register whose content depends on said presence or absence of said at least one chip card portion.

12. An electronic system said electronic system comprising.
- a chip card; and
- a chip card read-write device, said device having a microprocessor for executing a program including at least one step of reading data on said chip card, wherein said chip card has at least one portion designed to be irrevocably removed, execution of said program can be modified by removal of said at least one chip card portion.

* * * * *